US009593797B2

(12) United States Patent
Kulprathipanja et al.

(10) Patent No.: US 9,593,797 B2
(45) Date of Patent: Mar. 14, 2017

(54) HYBRID HIGH TEMPERATURE INSULATION

(71) Applicant: JOHNS MANVILLE, Denver, CO (US)

(72) Inventors: Ames Kulprathipanja, Broomfield, CO (US); Rick Lee Dolin, Fruita, CO (US); Severiano Almidon Lopez, Clifton, CO (US)

(73) Assignee: Johns Manville, Denver, CO (US)

( * ) Notice: Subject to any disclaimer, the term of this patent is extended or adjusted under 35 U.S.C. 154(b) by 103 days.

(21) Appl. No.: 14/610,786

(22) Filed: Jan. 30, 2015

(65) Prior Publication Data

US 2016/0223124 A1   Aug. 4, 2016

(51) Int. Cl.
| | |
|---|---|
| F16L 59/02 | (2006.01) |
| F16L 59/06 | (2006.01) |
| C04B 28/00 | (2006.01) |
| F16L 59/04 | (2006.01) |

(52) U.S. Cl.
CPC .............. *F16L 59/06* (2013.01); *C04B 28/00* (2013.01); *F16L 59/024* (2013.01); *F16L 59/04* (2013.01)

(58) Field of Classification Search
CPC ................................................ E04B 2001/742
See application file for complete search history.

(56) References Cited

U.S. PATENT DOCUMENTS

| | | | | |
|---|---|---|---|---|
| 4,303,450 A | * | 12/1981 | Hacker | .................... C04B 28/10 |
| | | | | 106/675 |
| 5,256,222 A | | 10/1993 | Shepherd et al. | |
| 7,078,359 B2 | | 7/2006 | Stepanian et al. | |
| 2007/0154698 A1 | | 7/2007 | Stepanian | |
| 2007/0259979 A1 | | 11/2007 | Lee | |
| 2007/0264485 A1 | | 11/2007 | Stepanian et al. | |
| 2007/0272902 A1 | | 11/2007 | Evans et al. | |
| 2012/0238174 A1 | | 9/2012 | Bullock et al. | |
| 2012/0326072 A1 | * | 12/2012 | Baek | ..................... C04B 14/185 |
| | | | | 252/62 |

FOREIGN PATENT DOCUMENTS

WO   WO 2012/047012   *   4/2012

OTHER PUBLICATIONS

Translation for WO 2012/047012, Apr. 12, 2012.*
Abstract for CN 103553544, Feb. 5, 2014.*
Translation of description for CN 103553544, Feb. 5, 2014.*
Industrial Insulations Group, LLC, Sproule WR-1200 Perlite Pipe & Block Insulation, Pipe & Equipment Insulations, 2014, USA.

* cited by examiner

*Primary Examiner* — Carol M Koslow
(74) *Attorney, Agent, or Firm* — Robert D. Touslee

(57) ABSTRACT

According to one aspect, a hybrid high temperature thermal insulation includes a mix of inorganic granules. The granular mix includes at least 70 weight percent porous inorganic granules in the form of expanded perlite, and at most 30 weight percent second porous inorganic granules other than expanded perlite. The hybrid insulation also includes a binder. In example formulations, the second porous inorganic particles may be made from crushed aerogel, from fumed silica, from precipitated silica, or from other substances. The hybrid insulation may be formed into preferred shapes, for example a board shape or a semi-cylindrical shape configured to fit over a round tube of a predetermined diameter.

32 Claims, 3 Drawing Sheets

HYBRID HIGH TEMPERATURE INSULATION

BACKGROUND OF THE INVENTION

Insulating structures or equipment in high temperature environments presents special challenges. For example, some industrial processes involve piping or containers holding fluids at temperatures approaching 1200° F. or more. Thermal insulation may be provided to reduce the loss of valuable heat from a process, to maintain proper reaction temperatures, for the safety and comfort of personnel working near the process, and other reasons.

Besides preferably having a low thermal conductivity, a basic requirement of insulation in such applications is that it be able to withstand the high temperatures without degradation. Preferably, the material should also be strong enough to withstand handling without excessive damage, light in weight if possible, resistant to chemical attack, and non-combustible. Due to the requirement to withstand high temperatures, such insulation is often made of inorganic materials such as mineral fibers, calcium silicate, and perlite.

BRIEF SUMMARY OF THE INVENTION

According to one aspect, a hybrid high temperature thermal insulation comprises a mix of inorganic granules. The granular mix comprises at least 70 weight percent first porous inorganic granules in the form of expanded perlite, and at most 30 weight percent second porous inorganic granules. The second porous inorganic granules are other than expanded perlite. The hybrid high temperature insulation further comprises a binder. The second porous inorganic granules may comprise aerogel particles. The second porous inorganic granules may comprise silica aerogel particles. The second porous inorganic granules may comprise fumed silica particles. The second porous inorganic granules may comprise precipitated silica particles. In some embodiments, the binder is sodium silicate. In some embodiments, the hybrid high temperature thermal insulation further comprises reinforcing fibers. In some embodiments, the insulation has a density of between 9 and 16 lbs/ft$^3$. In some embodiments, the insulation has a thermal conductivity of less than 0.6 BTU-in/(ft$^2$-h-° F.) when measured at 500° F. In some embodiments, the insulation has a thermal conductivity of less than 0.5 BTU-in/(ft$^2$-h-° F.) when measured at 500° F. In some embodiments, the second porous inorganic granules are hydrophobic. In some embodiments, the second porous inorganic granules comprise an organic coating that renders the second porous inorganic granules hydrophobic. The second porous inorganic granules may be hydrophilic. In some embodiments the mix comprises at least 80 weight percent expanded perlite. In some embodiments, the mix comprises at least 85 weight percent expanded perlite. In some embodiments, the mix comprises at least 90 weight percent expanded perlite. In some embodiments, the mix comprises at least 94 weight percent expanded perlite.

According to another aspect, a method of making thermal insulation comprises forming a mixture having at least 70 weight percent porous inorganic granules in the form of expanded perlite and at most 30 weight percent second porous inorganic granules, the second porous inorganic granules being other than expanded perlite. The method further comprises adding a binder to the mixture, pressing the mixture to a predetermined shape, and oven drying the pressed shape. In some embodiments, pressing the mixture to a predetermined shape comprises pressing the mixture into a hollow semi-cylindrical shape configured to fit over a round tube of a predetermined diameter. In some embodiments, pressing the mixture to a predetermined shape comprises pressing the mixture into a board shape. The method may further comprise cutting the predetermined shape to a final size. In some embodiments, the second porous inorganic granules comprise aerogel particles. In some embodiments, the second porous inorganic granules comprise fumed silica particles or precipitated silica particles.

DETAILED DESCRIPTION OF THE INVENTION

Figure 1:
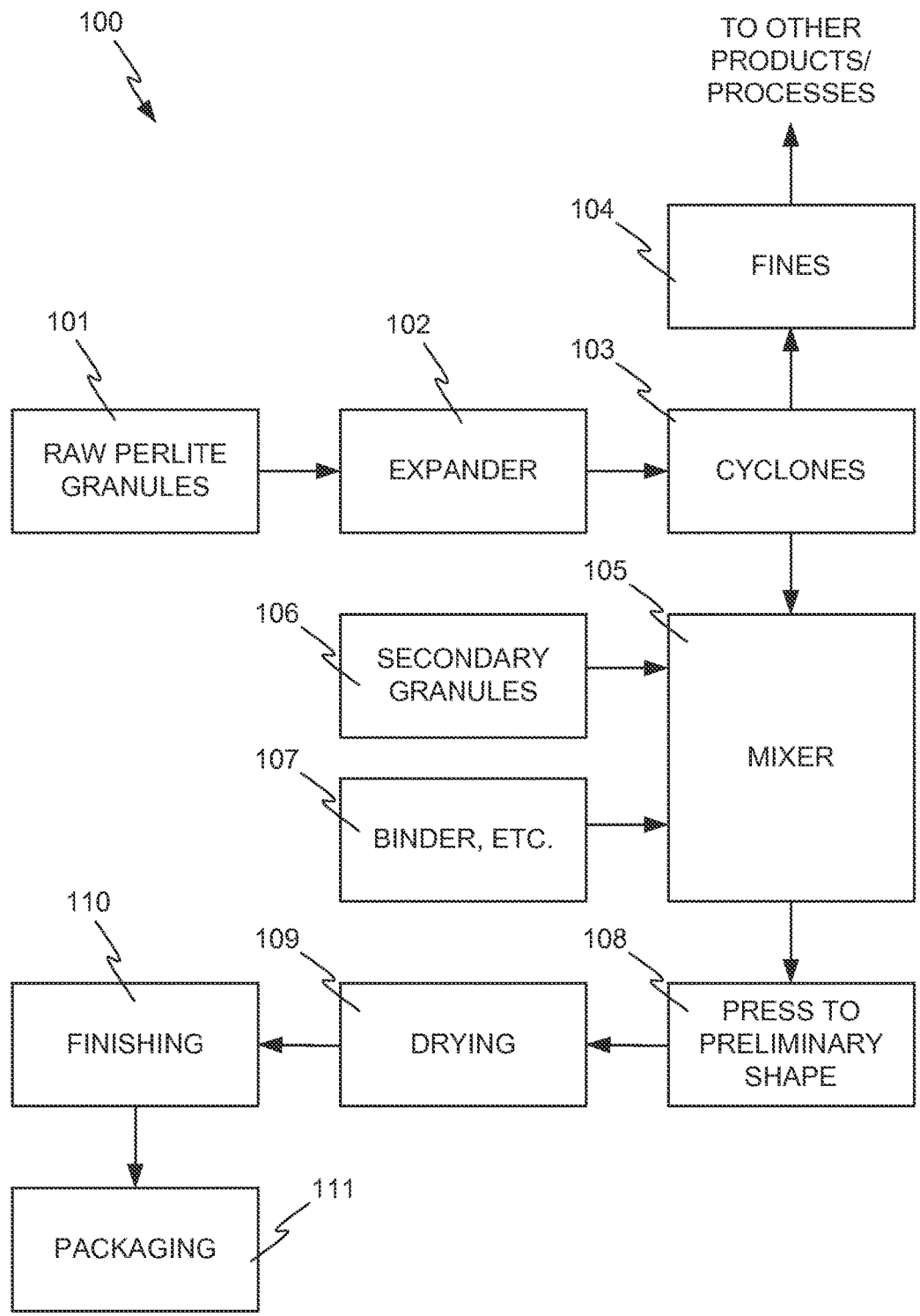
FIG. 1 illustrates a system and method of making a hybrid insulation product, in accordance with embodiments of the invention.

High temperature insulation has been made from expanded perlite. Perlite is a naturally occurring volcanic glass that has a significant water content. When perlite is rapidly heated to 1560-1650° F., water trapped in the structure vaporizes and escapes, greatly expanding the molten glass material in the process. Unexpanded perlite "ore" has a typical bulk density of about 1.1 g/cm$^3$, while expanded perlite has a typical bulk density between 0.03 and 0.15 g/cm$^3$. Expanded perlite is composed of granules and can be used for many purposes, including insulation. Expanded perlite is generally white, due to the reflectivity of bubbles trapped in the material. Thus, expanded perlite is a porous inorganic material made up of granules of foamed glass with both closed and open cells.

In forming insulation, the expanded perlite granules are typically mixed with a binder, for example sodium silicate or another suitable binder, to form a mixture that can be pressed into preferred shapes. The mixture may be pressed into rectangular blocks or boards, into semi-cylindrical shapes figured to fit over piping, or other shapes. The unpressed mixture may have a bulk density of about 4-5 lbs/ft$^3$ and the pressed shape may typically have a density of about 13-15 lbs/ft$^3$, although other densities are possible. The resulting article is then dried, typically in an oven, and may be cut to preferred dimensions. For example pipe insulation may be cut to specific lengths, and board insulation may be cut to a specific length, width, and thickness.

The thermal conductivity of perlite insulation is temperature-dependent, and may typically range, for example, from about 0.47 BTU-in/(hr-ft$^2$-° F.) at 100° F. to about 0.85 BTU-in/(hr-ft$^2$-° F.) at 800° F.

According to embodiments of the invention, a second kind of porous inorganic granules are included in insulation, in addition to expanded perlite granules. At least some performance properties of the resulting insulation may be improved as compared with insulation made from perlite granules alone.

In some embodiments, the second inorganic granules are aerogel particles. An aerogel is a very light weight porous material derived from a gel in which the liquid component of the gel has been replaced with a gas. While aerogels can be made from a variety of materials, silica aerogel is common. Silica aerogel typically has a density of about 150 Kg/m³, and may have a thermal conductivity as low as 0.02 W/(m-K). Silica aerogel particles are commercially available, for example from Cabot Corporation of Boston, Mass., USA. in some embodiments, aerogel particles having a characteristic size of about 0.04-0.2 mm may be used, although other sizes may be used in other embodiments.

In other embodiments, the second inorganic granules are made from fumed silica. Fumed silica may be made from microscopic droplets of amorphous silica fused into branched, chainlike, three-dimensional secondary particles which then agglomerate into tertiary particles. The resulting powder has an extremely low bulk density and high surface area. Fumed silica is typically made in a flame. Bulk fumed silica is porous, and has a density much lower than the density of the base silica material. For the purposes of this disclosure, "porous" includes materials in which small passages exist within the material. In some embodiments, fumed silica particles having a characteristic size of about 5-400 μm may be used, although other sizes may be used in other embodiments.

In other embodiments, the second porous inorganic granules are made from precipitated silica. Precipitated silica is typically made by precipitation from a solution containing silicate salts. The resulting fine particles are porous, and have a bulk density lower than the density of the base silica material. In some embodiments, precipitated silica particles having a characteristic size of about 8-12 μm may be used, although other sizes may be used as well.

In some embodiments in which the second granules are made from silica, the granules may be hydrophobic or hydrophilic. For example, hydrophobic fumed silica is typically made by bonding alkyl or polydimethylsiloxane groups to the silica. Untreated fumed silica may be hydrophilic. For the purposes of this disclosure, inorganic granules having an organic coating to render them hydrophobic are still considered to be inorganic granules.

FIG. 1 illustrates a system and method 100 of making a hybrid insulation product, in accordance with embodiments of the invention. As shown in FIG. 1, raw perlite granules 101 are fed to an expander 102. For example, raw perlite granules 101 may have a size distribution ranging from about 40 to about 800 microns, although other particle sizes may be used in other embodiments. Raw perlite granules are readily commercially available from a number of suppliers. Expander 102 heats the raw granules, causing them to expand as described above, due to the expansion of water trapped in the raw perlite ore. The granules may also fracture, so that each ore granule may create multiple expanded particles. The expanded perlite particles may be fed to one or more cyclones 103 or other devices for separating the particles by size. For example, particles having a characteristic dimension of 50 to 1000 microns may be used in forming the hybrid insulation, while finer particles 104 may be deemed not suitable for use in the hybrid insulation. The finer particles 104 may be separated and removed, for use in making other products or for use in other industrial processes. In other embodiments, other size ranges may be used.

The expanded perlite particles deemed usable for making insulation are fed to a mixer 105, along with the secondary granules 106. Mixer 105 may be, for example, a batch or continuous mixer. Secondary granules 106 may be, for example, aerogel particles, fumed silica particles, or precipitated silica particles as described above. A binder 107 is preferably added, for example sodium silicate. Other additives may be added to the mixer as well, for example one or more opacifiers, reinforcing fibers, or the like.

Reinforcing fibers may add strength to the hybrid insulation and reduce its brittleness. Reinforcing fibers may be made of, for example, glass, polyester, or other materials or combinations of materials. The reinforcing fibers may be of any workable dimensions, for example from about ¼ inch to 1.5 inches in length, and about 2 to 25 μm in diameter, although other dimensions may be used as well.

Figure 2A:
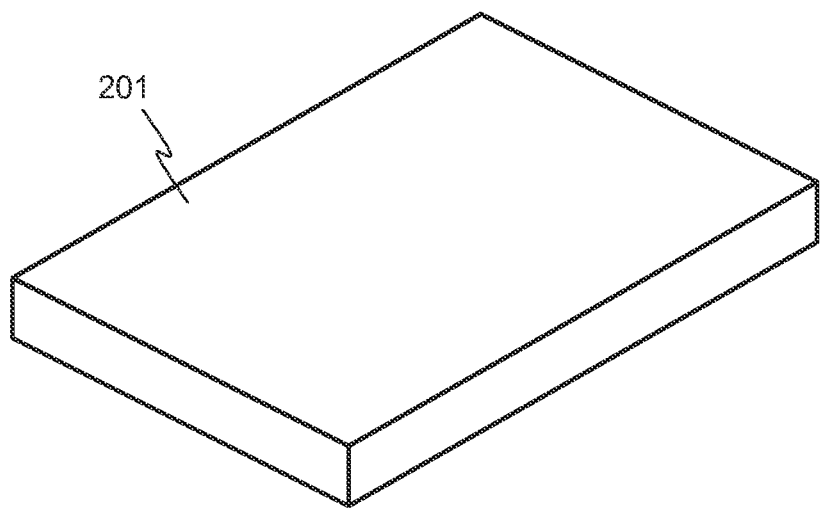
FIGS. 2A and 2B illustrate board and semi-cylindrical shapes, in accordance with embodiments of the invention.
Figure 2B:
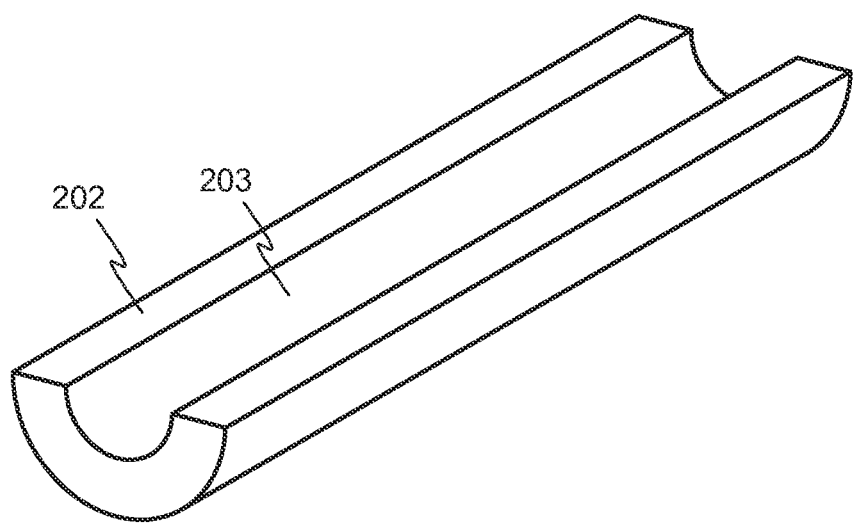

The mixture may then be pressed 108 into preliminary shapes, for example sheets or semi-cylindrical shapes. The shapes may then be dried 109, for example in a drying oven, and then cut 110 to final dimensions. The finished insulation elements may then be packaged 111 for shipping. FIG. 2A illustrates insulation formed into a board shape 201, and FIG. 2B shows insulation formed into a semi-cylindrical shape 202, in accordance with embodiments of the invention. For example, inner surface 203 of shape 202 may be sized to fit over a pipe of a particular diameter. A range of insulation sizes may be produced for us in different applications.

EXAMPLES

A number of example hybrid materials have been constructed, according to the data shown in Table 1 below.

TABLE 1

Makeup of Examples

| Sample # | Secondary Particle type | Weight % secondary particles | Secondary particle size |
|---|---|---|---|
| 0 | None | 0 | — |
| 1 | Silica Aerogel | 5 | 0.06-0.1 mm |
| 2 | Silica Aerogel | 10 | 0.06-0.1 mm |
| 3 | Hydrophobic fumed silica | 10 | 10-200 μm |
| 4 | Hydrophobic precipitated silica | 10 | 9.5 μm |
| 5 | Hydrophilic fumed silica | 10 | 10-200 μm |
| 6 | Silica Aerogel | 30 | 0.01-1.2 mm |

Table 2 shows certain physical properties of the samples listed in Table 1, as available. Linear shrinkage refers to the shrinkage of the finished insulation product when subjected to high temperatures, for example 1200° F., which may be higher than the temperatures used in manufacturing of the insulation. Water absorption refers to the change in weight of the insulation after soaking in water. Compression strength refers to the compressive stress that produces a 5% compression of the product. Flexural strength refers to the bending stress required to cause a fracture of the product. Friability refers to the tendency of the insulation product to crumble during handling and shipping, and may be measured, for example, by tumbling one-inch cubes of the material for 10 minutes and measuring the weight loss of the cubes in the tumbling process.

TABLE 2

Physical Properties

| Sample # | Density (lb/ft$^3$) | Linear shrinkage (%) | Water absorption (%) | Compression Strength (lb/in$^2$) | Flexural Strength (lb/in$^2$) | Friability (% Loss) |
|---|---|---|---|---|---|---|
| 0 | 14.9 | 0.08 | 12.98 | 56 | 37 | 77.0 |
| 1 | 14.5 | 2.37 | 11.55 | 37 | 31 | 79.2 |
| 2 | 13.2 | 4.75 | 12.35 | 15 | 13 | 99.8 |
| 3 | 14.7 | 1.14 | 17.36 | 42 | 27 | 84.7 |
| 4 | 15.3 | 1.00 | 17.53 | 49 | 24 | 84.0 |
| 5 | 15.1 | 0.25 | 13.81 | 48 | 22 | 88.4 |
| 6 | 9.8 | | | | | |

Figure 3:
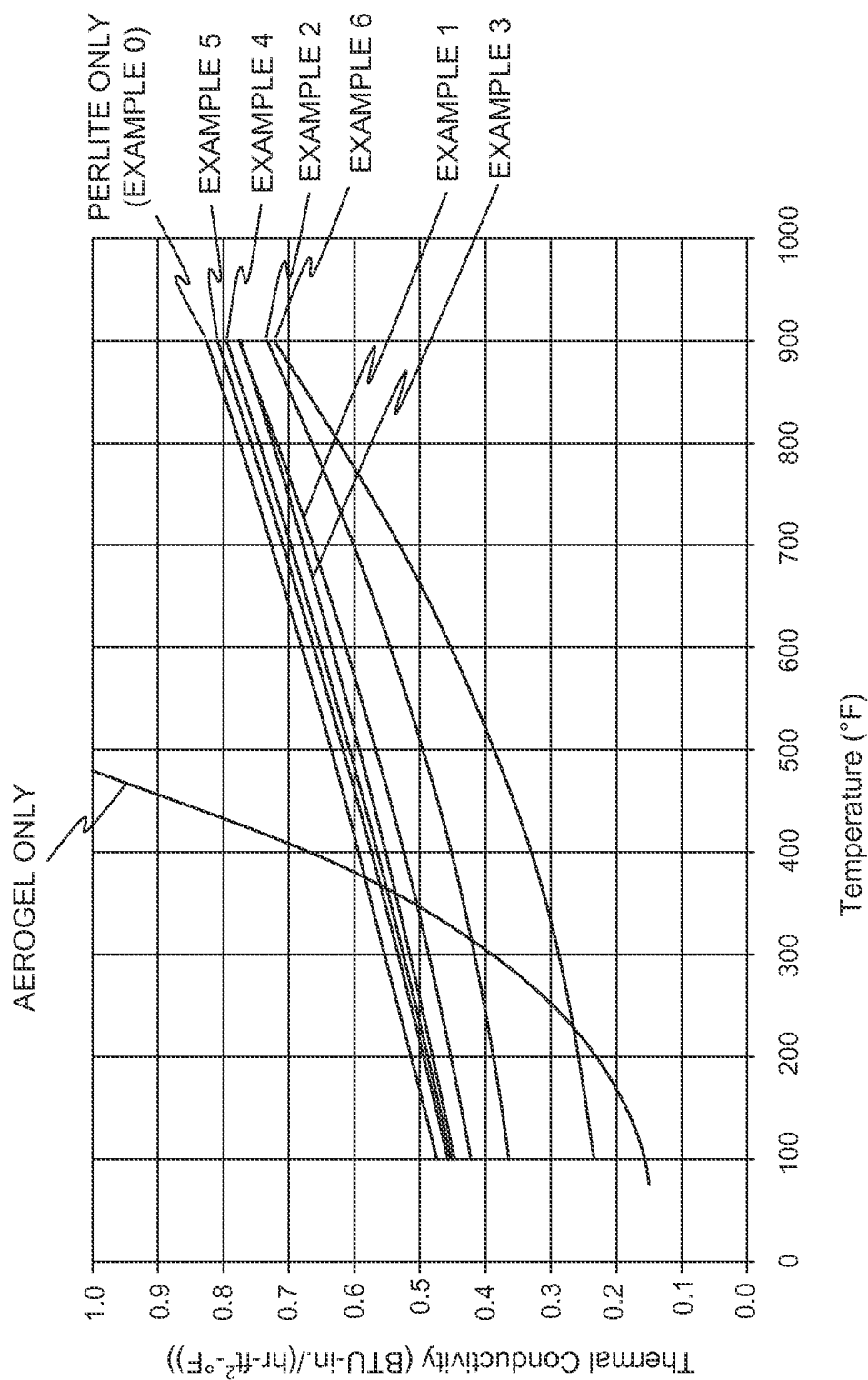
FIG. 3 illustrates the thermal performance of several example hybrid insulation compositions in accordance with embodiments of the invention, as well as the thermal performance of perlite insulation without secondary granules, and the thermal performance of aerogel granules alone.

Table 3 lists thermal performance data for the samples listed in Table 1. FIG. 3 illustrates the thermal performance of the example compositions, as well as the thermal performance of perlite insulation without secondary particles (example #0), and the thermal performance of aerogel particles alone.

TABLE 3

Thermal Conductivity (BTU-in/(ft$^2$-h-° F.)) at listed temperatures.

| Sample # | 100° F. | 300° F. | 500° F. | 700° F. | 900° F. |
|---|---|---|---|---|---|
| 0 | 0.474 | 0.551 | 0.635 | 0.727 | 0.826 |
| 1 | 0.422 | 0.486 | 0.567 | 0.663 | 0.776 |
| 2 | 0.364 | 0.416 | 0.495 | 0.601 | 0.733 |
| 3 | 0.447 | 0.515 | 0.592 | 0.678 | 0.774 |
| 4 | 0.452 | 0.525 | 0.607 | 0.697 | 0.795 |
| 5 | 0.457 | 0.533 | 0.617 | 0.709 | 0.809 |
| 6 | 0.234 | 0.287 | 0.386 | 0.531 | 0.722 |

As is apparent from the above tables and from FIG. 3, hybrid insulation products according to embodiments of the invention may have superior insulating properties as compared with insulation made from perlite without any secondary granules, and at some temperatures may have a lower thermal conductivity than even aerogel particles alone. For any particular application, the preferred combination of perlite and secondary granules will depend on a large number of factors, for example the relative costs of perlite and the secondary granules, physical strength requirements, shipping and handling costs, and other factors.

Because a hybrid insulation embodying the invention may have a lower thermal conductivity than perlite insulation made without secondary granules, it may be possible to use a thinner hybrid insulation in place of perlite insulation, to achieve the same insulating performance. The thinner insulation takes up less space in situ and during shipping, and may result in lower shipping and storage costs. Alternatively, hybrid insulation at least as thick as alternative perlite insulation may be used, resulting in reduced heat loss as compared with perlite insulation.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A hybrid high temperature thermal insulation, comprising:
   a mix of inorganic granules, the mix comprising at least 70 weight percent first porous inorganic granules in the form of expanded perlite, and at most 30 weight percent second porous inorganic granules, the second porous inorganic granules being other than expanded perlite; and
   a binder;
   wherein the insulation has a density of between 9 and 16 lbs/ft$^3$.

2. The hybrid high temperature thermal insulation of claim 1, wherein the second porous inorganic granules comprise aerogel particles.

3. The hybrid high temperature thermal insulation of claim 2, wherein the second porous inorganic granules comprise silica aerogel particles.

4. The hybrid high temperature thermal insulation of claim 3, wherein the mix comprises about 5 weight percent silica aerogel particles.

5. The hybrid high temperature thermal insulation of claim 3, wherein the mix comprises about 10 weight percent silica aerogel particles.

6. The hybrid high temperature thermal insulation of claim 3, wherein the mix comprises about 30 weight percent silica aerogel particles.

7. The hybrid high temperature thermal insulation of claim 6, wherein the silica aerogel particles have a particle size of between 0.01 and 1.2 millimeters.

8. The hybrid high temperature thermal insulation of claim 1, wherein the second porous inorganic granules comprise fumed silica particles.

9. The hybrid high temperature thermal insulation of claim 8, wherein the mix comprises about 10 weight percent hydrophobic fumed silica.

10. The hybrid high temperature thermal insulation of claim 8, wherein the mix comprises about 10 weight percent hydrophilic fumed silica.

11. The hybrid high temperature thermal insulation of claim 1, wherein the second porous inorganic granules comprise precipitated silica particles.

12. The hybrid high temperature thermal insulation of claim 8, wherein the mix comprises about 10 weight percent hydrophobic precipitated silica.

13. The hybrid high temperature thermal insulation of claim 1, wherein the binder is sodium silicate.

14. The hybrid high temperature thermal insulation of claim 1, further comprising reinforcing fibers.

15. The hybrid high temperature thermal insulation of claim 1, wherein the insulation has a thermal conductivity of less than 0.6 BTU-in/(ft$^2$-h-° F.) when measured at 500° F.

16. The hybrid high temperature thermal insulation of claim 1, wherein the insulation has a thermal conductivity of less than 0.5 BTU-in/(ft$^2$-h-° F.) when measured at 500° F.

17. The hybrid high temperature thermal insulation of claim 1, wherein the second porous inorganic granules are hydrophobic.

18. The hybrid high temperature thermal insulation of claim 17, wherein the second porous inorganic granules comprise an organic coating that renders the second porous inorganic granules hydrophobic.

19. The hybrid high temperature thermal insulation of claim 1, wherein the second porous inorganic granules are hydrophilic.

20. The hybrid high temperature thermal insulation of claim 1, wherein the mix comprises at least 80 weight percent expanded perlite.

21. The hybrid high temperature thermal insulation of claim 1, wherein the mix comprises at least 85 weight percent expanded perlite.

22. The hybrid high temperature thermal insulation of claim 1, wherein the mix comprises at least 90 weight percent expanded perlite.

23. The hybrid high temperature thermal insulation of claim 1, wherein the mix comprises at least 94 weight percent expanded perlite.

24. A hybrid thermal insulation, comprising:
a mix of inorganic granules, the mix comprising at least 70 weight percent first porous inorganic granules in the form of expanded perlite, and at most 30 weight percent second porous inorganic granules, the second porous inorganic granules being other than expanded perlite; and
a binder;
wherein the insulation has a thermal conductivity of less than 0.6 BTU-in/(ft$^2$-h-° F.) when measured at 500° F.

25. The hybrid thermal insulation of claim 24, wherein the insulation has a density of between 9 and 16 lbs/ft$^3$.

26. The hybrid thermal insulation of claim 25, wherein the second porous inorganic granules comprise aerogel particles.

27. The hybrid thermal insulation of claim 25, wherein the second porous inorganic granules comprise silica aerogel particles.

28. A method of making thermal insulation, the method comprising:
forming a mixture having at least 70 weight percent porous inorganic granules in the form of expanded perlite and at most 30 weight percent second porous inorganic granules, the second porous inorganic granules being other than expanded perlite;
adding a binder to the mixture;
pressing the mixture to a predetermined shape;
oven drying the pressed shape; and
cutting the predetermined shape to a final size.

29. The method of claim 28, wherein pressing the mixture to a predetermined shape comprises pressing the mixture into a hollow semi-cylindrical shape configured to fit over a round tube of a predetermined diameter.

30. The method of claim 28, wherein pressing the mixture to a predetermined shape comprises pressing the mixture into a board shape.

31. The method of claim 28, wherein the second porous inorganic granules comprise aerogel particles.

32. The method of claim 28, wherein the second porous inorganic granules comprise fumed silica particles or precipitated silica particles.

* * * * *